(12) United States Patent
Egashira

(10) Patent No.: US 10,914,373 B2
(45) Date of Patent: Feb. 9, 2021

(54) TRANSPORT APPARATUS

(71) Applicant: HONDA MOTOR CO., LTD., Tokyo (JP)

(72) Inventor: Fumio Egashira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 16/240,870

(22) Filed: Jan. 7, 2019

(65) Prior Publication Data
US 2019/0219152 A1    Jul. 18, 2019

(30) Foreign Application Priority Data

Jan. 12, 2018 (JP) ................................ 2018-003705
Dec. 5, 2018 (JP) ................................ 2018-228303

(51) Int. Cl.
*B60W 10/02* (2006.01)
*F16H 59/68* (2006.01)
(Continued)

(52) U.S. Cl.
CPC ......... *F16H 59/68* (2013.01); *B60W 10/0235* (2020.02); *B60W 30/184* (2013.01);
(Continued)

(58) Field of Classification Search
CPC ........ F16H 2059/725; B60W 10/0235; B60W 30/184; B60W 30/1843;
(Continued)

(56) References Cited

U.S. PATENT DOCUMENTS 5,347,885 A * 9/1994 Taga .................... F16H 61/0213
477/65
2005/0177294 A1* 8/2005 Jiang ..................... F16D 48/066
701/67
(Continued)

FOREIGN PATENT DOCUMENTS

CA        -2976324 A1 * 8/2016
CN       104956108 A    9/2015
(Continued)

OTHER PUBLICATIONS

Chinese Office Action issued for Chinese Patent Application No. 201910019956.9 dated Apr. 2, 2020 (with Partial Translation).
(Continued)

*Primary Examiner* — Roger L Pang
(74) *Attorney, Agent, or Firm* — Thomas Horstemeyer, LLP

(57) ABSTRACT

A transport apparatus includes: a driving source; an output shaft; and a power transmission device capable of performing power transmission between the driving source and the output shaft. The transport apparatus comprises a control device which controls the driving source and the power transmission device, wherein the power transmission device includes a connecting/disconnecting unit configured to control a fastened state in which the power transmission is performed, and a released state in which the power transmission is not performed, and wherein the control device controls the connecting/disconnecting unit based on a thermal history of the connecting/disconnecting unit.

10 Claims, 11 Drawing Sheets

(51) Int. Cl.
  *B60W 30/184* (2012.01)
  *F16H 3/62* (2006.01)
  *F16H 59/72* (2006.01)

(52) U.S. Cl.
  CPC . *B60W 30/1843* (2013.01); *B60W 2510/0241* (2013.01); *B60W 2710/021* (2013.01); *B60W 2710/024* (2013.01); *F16H 3/62* (2013.01); *F16H 2059/725* (2013.01); *F16H 2200/0069* (2013.01); *F16H 2200/2012* (2013.01); *F16H 2200/2046* (2013.01); *F16H 2200/2048* (2013.01); *F16H 2710/00* (2013.01)

(58) Field of Classification Search
  CPC ... B60W 2510/0241; B60W 2710/024; B60W 2710/021; Y10T 477/635; Y10T 477/6395
  USPC .............................................. 701/59, 66, 68
  See application file for complete search history.

(56) References Cited

U.S. PATENT DOCUMENTS

| | | | |
|---|---|---|---|
| 2011/0166760 A1* | 7/2011 | Kiessner-Haiden | ........................ F16D 48/064 701/68 |
| 2012/0232767 A1* | 9/2012 | MacMillian | ............ F16D 48/06 701/67 |
| 2014/0209425 A1* | 7/2014 | Tsutsui | .................... F16D 43/25 192/55.1 |
| 2015/0323395 A1 | 11/2015 | Kawakami et al. | |
| 2016/0084375 A1* | 3/2016 | Yoon | ..................... F16H 61/688 701/55 |
| 2017/0120914 A1* | 5/2017 | Yoon | ................... B60W 30/182 |
| 2017/0219094 A1* | 8/2017 | Jammulamadaka | .. F16H 61/143 |
| 2018/0266546 A1* | 9/2018 | Kubo | .................. F16H 61/0213 |
| 2018/0312156 A1* | 11/2018 | Yoon | ....................... B60K 6/48 |

FOREIGN PATENT DOCUMENTS

| | | |
|---|---|---|
| JP | 05-231443 A | 9/1993 |
| JP | 2011-099513 A | 5/2011 |
| JP | 2011231787 A | 11/2011 |

OTHER PUBLICATIONS

Japanese Office Action for Japanese Patent Application No. 2018-228303 dated Sep. 4, 2020. (partial translation).

* cited by examiner

FIG. 3

|  | C1 | C2 | C3 | B1 | B2 | B3 | F1 |
|---|---|---|---|---|---|---|---|
| RVS |  |  | ○ |  | ○ |  | ○ |
| 1st |  |  |  | ○ | ○ | (○) | △/○ |
| 2nd |  | ○ |  | ○ | ○ |  | (△) |
| 3rd |  |  | ○ | ○ | ○ |  | (△) |
| 4th |  | ○ | ○ | ○ |  |  | (△) |
| 5th | ○ |  | ○ | ○ |  |  | (△) |
| 6th | ○ | ○ | ○ |  |  |  | (△) |
| 7th | ○ |  | ○ |  | ○ |  | (△) |
| 8th | ○ | ○ |  |  | ○ |  | (△) |
| 9th | ○ |  |  |  | ○ | ○ | (△) |
| 10th | ○ | ○ |  |  |  | ○ | (△) |
| P/N |  |  |  |  |  |  | △/○ |

FIG. 5

| LC PLATE TEMPERATURE | CONVERSION COEFFICIENT |
|---|---|
| T1 | K1 |
|  |  |
|  |  |
| ⋮ | ⋮ |
|  |  |
| T0 | K0 |
|  |  |
| ⋮ | ⋮ |
|  |  |
| T2 | K2 |
|  |  |
| ⋮ | ⋮ |
|  |  |

FIG. 10

| LC PLATE TEMPERATURE (°C) | LC CALORIFIC VALUE (cal) | | | | | | |
|---|---|---|---|---|---|---|---|
| | CV1 | CV2 | CV3 | CV4 | CV5 | CV6 | CV7 |
| T8 | KS81 | KS82 | KS83 | KS84 | KS85 | KS86 | KS87 |
| T7 | KS71 | KS72 | KS73 | KS74 | KS75 | KS76 | KS77 |
| T6 | KS61 | KS62 | KS63 | KS64 | KS65 | KS66 | KS67 |
| T5 | KS51 | KS52 | KS53 | KS54 | KS55 | KS56 | KS57 |
| T4 | KS41 | KS42 | KS43 | KS44 | KS45 | KS46 | KS47 |
| T3 | KS31 | KS32 | KS33 | KS34 | KS35 | KS36 | KS37 |
| T2 | KS21 | KS22 | KS23 | KS24 | KS25 | KS6 | KS27 |
| T1 | KS11 | KS12 | KS13 | KS14 | KS15 | KS16 | KS17 |

TRANSPORT APPARATUS

CROSS-REFERENCE TO RELATED APPLICATION(S)

This application claims priority to and the benefit of Japanese Patent Application No. 2018-003705 filed on Jan. 12, 2018, and Japanese Patent Application No. 2018-228303 filed on Dec. 5, 2018, the entire disclosures of which are incorporated herein by reference.

BACKGROUND OF THE INVENTION

Field of the Invention

The present invention relates to a transport apparatus.

Description of the Related Art

Japanese Patent Laid-Open No. 5-231443 discloses that the friction coefficient of a wet multiple disc clutch changes with time.

Japanese Patent Laid-Open No. 5-231443 discloses the arrangement of a clutch in which members different in surface roughness are brought into contact with a friction material in order to suppress fluctuations in torque capacity caused by the change in friction coefficient with time. However, Japanese Patent Laid-Open No. 5-231443 does not disclose the cause of the change in friction coefficient with time, that is, a parameter with which it is possible to grasp the friction coefficient which changes with time, and perform control by correcting the torque capacity of the wet multiple disc clutch.

The present invention provides a technique capable of controlling a connecting/disconnecting unit by using the thermal history as an evaluation parameter for the friction coefficient which changes with time.

SUMMARY OF THE INVENTION

According to one aspect of the present invention, there is provided a transport apparatus including: a driving source; an output shaft; and a power transmission device capable of performing power transmission between the driving source and the output shaft, the transport apparatus comprising a control device which controls the driving source and the power transmission device, wherein the power transmission device includes a connecting/disconnecting unit configured to control a fastened state in which the power transmission is performed, and a released state in which the power transmission is not performed, and wherein the control device controls the connecting/disconnecting unit based on a thermal history of the connecting/disconnecting unit.

The present invention makes it possible to control the connecting/disconnecting unit by using the thermal history as an evaluation parameter for the friction coefficient which changes with time.

BRIEF DESCRIPTION OF THE DRAWINGS

FIG. 3 is an engagement table (fastening table) showing engagement combinations of engaging mechanisms of the power transmission device;

FIG. 5 is a view showing a configuration example of a conversion table;

FIG. 10 is a view showing a configuration example of a conversion table of the second embodiment.

DESCRIPTION OF THE EMBODIMENTS

An embodiment of a transport apparatus of the present invention will be explained below with reference to the accompanying drawings. The constituent elements described in this embodiment are merely examples and are not limited by the following embodiment.

Figure 1:
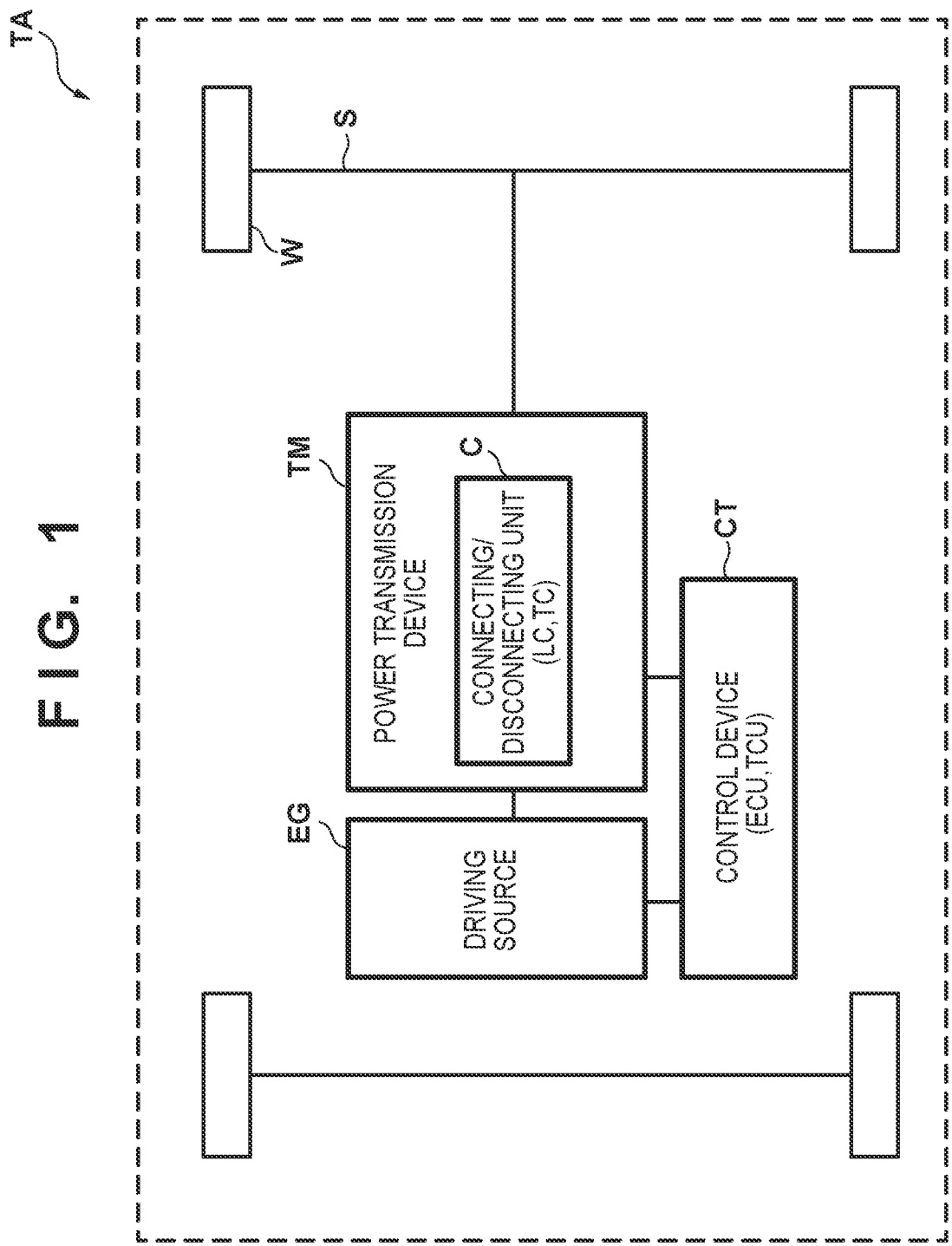
FIG. 1 is a block diagram showing an outline of the arrangement of a transport apparatus according to an embodiment.

FIG. 1 is a block diagram showing an outline of the arrangement of a transport apparatus TA according to the embodiment. The transport apparatus TA includes a driving source EG such as an engine or motor, an output shaft S to which driving wheels W are connected, and a power transmission device TM capable of transmitting power between the driving source EG and the output shaft S. The transport apparatus TA also includes a control device CT including an ECU and a TCU, and the control device (ECU, TCU) controls the driving source EG and the power transmission device TM. The power transmission device TM includes a connecting/disconnecting unit C capable of controlling (switching) a fastened state in which power transmission from the driving source EG is performed, and a released state in which no power transmission is performed. The connecting/disconnecting unit C includes a lock-up clutch LC and a torque converter TC. The control device (ECU, TCU) variably controls the connecting/disconnecting unit C based on the thermal history of the connecting/disconnecting unit C.

Figure 2:
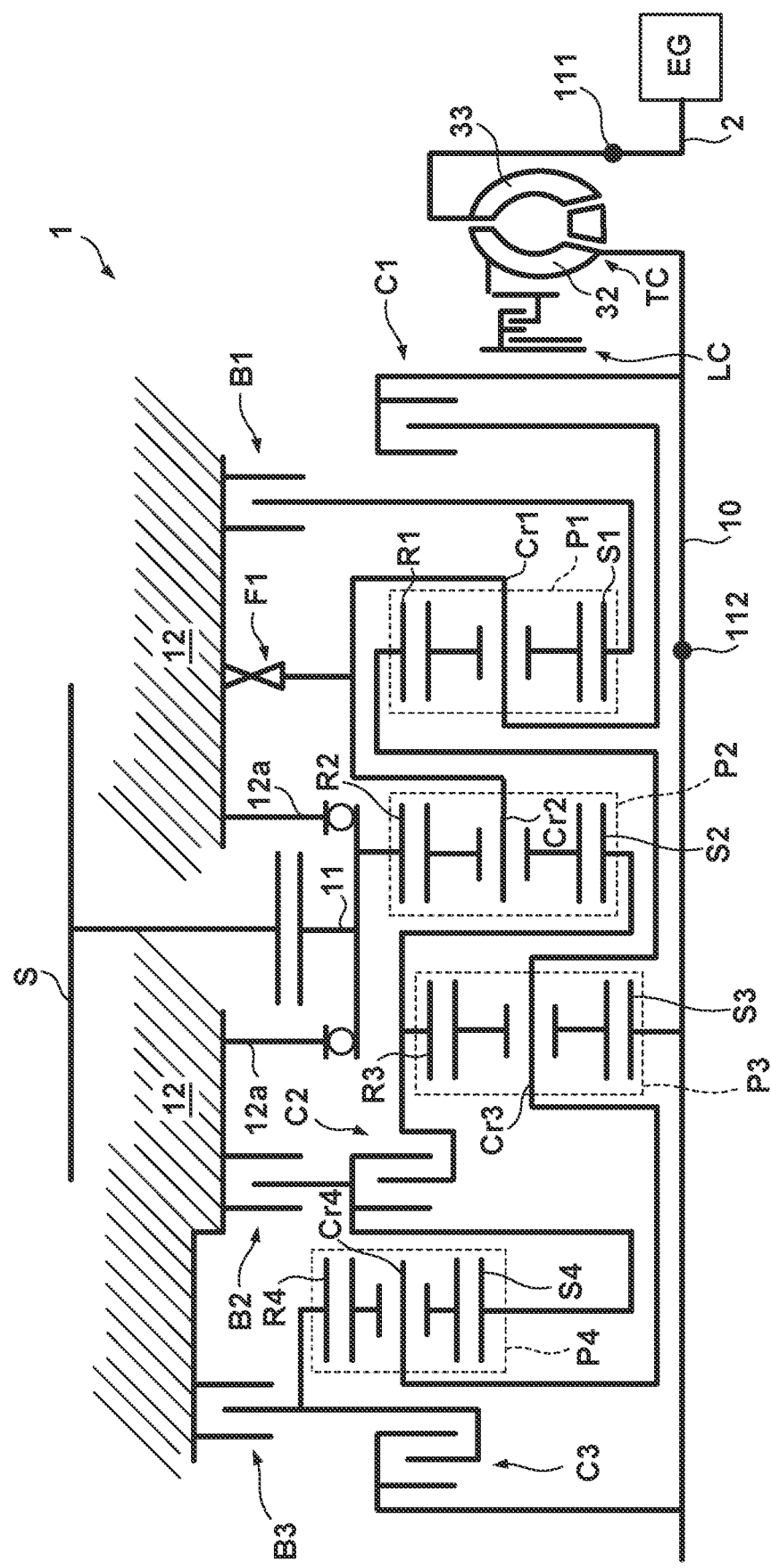
FIG. 2 is a skeleton view showing a configuration example of a power transmission device according to the embodiment.

FIG. 2 is a skeleton view showing a configuration example of the power transmission device TM (an automatic transmission) according to the embodiment. Referring to FIG. 2, the power transmission device TM includes an input shaft 10 rotatably axially supported in a casing 12 which forms a transmission case, a support member 12a supported by the casing 12, an output member 11 rotatably supported to be coaxial with the input shaft 10, and the output shaft S.

A driving force from the driving source EG (to be sometimes simply referred to as EG) is input to the input shaft 10, and the input shaft 10 is rotated by the driving force. A starting device is provided between the input shaft 10 and the driving source EG. Examples of the starting device are a clutch type starting device (single disc clutch, multiple disc clutch, or the like) and a hydraulic coupling type starting device (torque converter or the like). In this embodiment, the torque converter TC is provided. Hence, the driving force of the driving source EG is input to the input shaft 10 via the torque converter TC. The driving source EG is formed as, for example, a cylinder injection engine including a plurality of cylinders. An ignition plug and an electromagnetic fuel injection valve (fuel supply unit) (neither are shown) are attached to the cylinder head of the driving source EG on a cylinder basis. A high pressure fuel supplied from the fuel pump is injected from the fuel injection valve to the combustion chamber of each cylinder.

The output member 11 includes a gear concentric to the input shaft 10. The output shaft S includes a gear that meshes with the gear. The rotation of the input shaft 10 changes its speed via transmission mechanisms to be described below and is then transmitted to the output shaft S. The rotation (driving force) of the output shaft S is transmitted to the driving wheels W (FIG. 1) via, for example, differential gears (not shown).

As the transmission mechanisms, the power transmission device TM includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

Each of the engaging mechanisms C1 to C3, B1 to B3, and F1 functions as a clutch or a brake. A clutch connects/disconnects the rotational elements provided in the power transmission device TM. A brake connects/disconnects the rotational elements provided in the power transmission device TM to/from the casing 12. The rotational elements provided in the power transmission device TM include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaged state (fastened state) and a released state, and the states of the engaging mechanism F1 are switched, the driving force transmission paths from the input shaft 10 to the output member 11 are switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches. The engaging mechanisms C1 to C3 and B1 to B3 can function as the connecting/disconnecting unit C for performing power transmission from the driving source EG.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that transmits an input rotation to the output shaft S.

The clutch C1 connects the input shaft 10 to the carrier Cr1 of the planetary gear mechanism P1 and the carrier Cr2 connected to the carrier Cr1 in the engaged state, and disconnects them in the released state. Note that the released state will sometimes be referred to as a disengaged state. The clutch C2 connects the ring gear R3 of the planetary gear mechanism P3 to the sun gear S4 of the planetary gear mechanism P4 in the engaged state, and disconnects them in the released state. The clutch C3 connects the input shaft 10 to the ring gear R4 of the planetary gear mechanism P4 in the engaged state, and disconnects them in the released state.

The brake B1 connects the casing 12 to the sun gear S1 of the planetary gear mechanism P1 in the engaged state, and disconnects them in the released state. The brake B2 connects the casing 12 to the sun gear S4 of the planetary gear mechanism P4 in the engaged state, and disconnects them in the released state. The brake B3 connects the casing 12 to the ring gear R4 of the planetary gear mechanism P4 in the engaged state, and disconnects them in the released state.

As already described, the engaging mechanism F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 3 is an engagement table (fastening table) showing engagement combinations of the engaging mechanisms provided in the power transmission device TM. In this embodiment, 10 forward ranges (1st to 10th) and one reverse range (RVS) can be established. "P/N" represents non-running ranges; "P", a parking range; and "N", a neutral range.

In the example of the engagement table shown in FIG. 3, "O" indicates the engaged state, and no mark indicates the released state. Note that there are included engaging mechanisms that are set in the engaged state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaged state for the purpose of decreasing the engaging mechanisms to switch the engaged state. Similarly, in the fifth range (5th), engagement of the clutch C3 is not essential. However, when changing to the fourth range (4th) or sixth range (6th), the clutch C3 is set in the engaged state for the purpose of decreasing the engaging mechanisms to switch the engaged state.

As for the engaging mechanism F1, "O" indicates the rotation inhibition state, and "A" indicates the one-way rotation permission state. In the first range (1st), the engaging mechanism F1 can be set in either the rotation inhibition state or the one-way rotation permission state. In the rotation inhibition state, the engine brake is enabled. In the first range, the engaging mechanism F1 is set in the one-way rotation permission state. The engine brake is switched between the enabled state and a disabled state by engaging or releasing the brake B3. In FIG. 3, "0" of the brake B3 in the first range (1st) indicates this.

An algorithm to determine which state is set for the engaging mechanism F1 in the first range (1st) can appropriately be designed. In this embodiment, the state before a change to the first range (1st) is inherited. For example, when changed from the reverse range (RVS) to the first range (1st), the engaging mechanism F1 remains in the rotation inhibition state in the first range (1st). However, if, for example, the vehicle speed exceeds a predetermined speed, the engaging mechanism F1 is switched to the one-way rotation permission state. Similarly, when changed from other forward ranges (2nd to 10th) to the first range (1st), the engaging mechanism F1 remains in the one-way rotation permission state in the first range (1st).

In the non-running ranges (P/N) as well, the state of the engaging mechanism F1 can be either the rotation inhibition state or the one-way rotation permission state. In this embodiment, the state before a change to the non-running ranges (P/N) is inherited, as in the first range (1st). In the second range (2nd) to the 10th range (10th), the engaging mechanism F1 is set in the one-way rotation permission state, but slips because of the structure of the power transmission device TM. For this reason, the state of the engaging mechanism F1 is indicated by "(Δ)".

<Control Device>

Figure 4A:
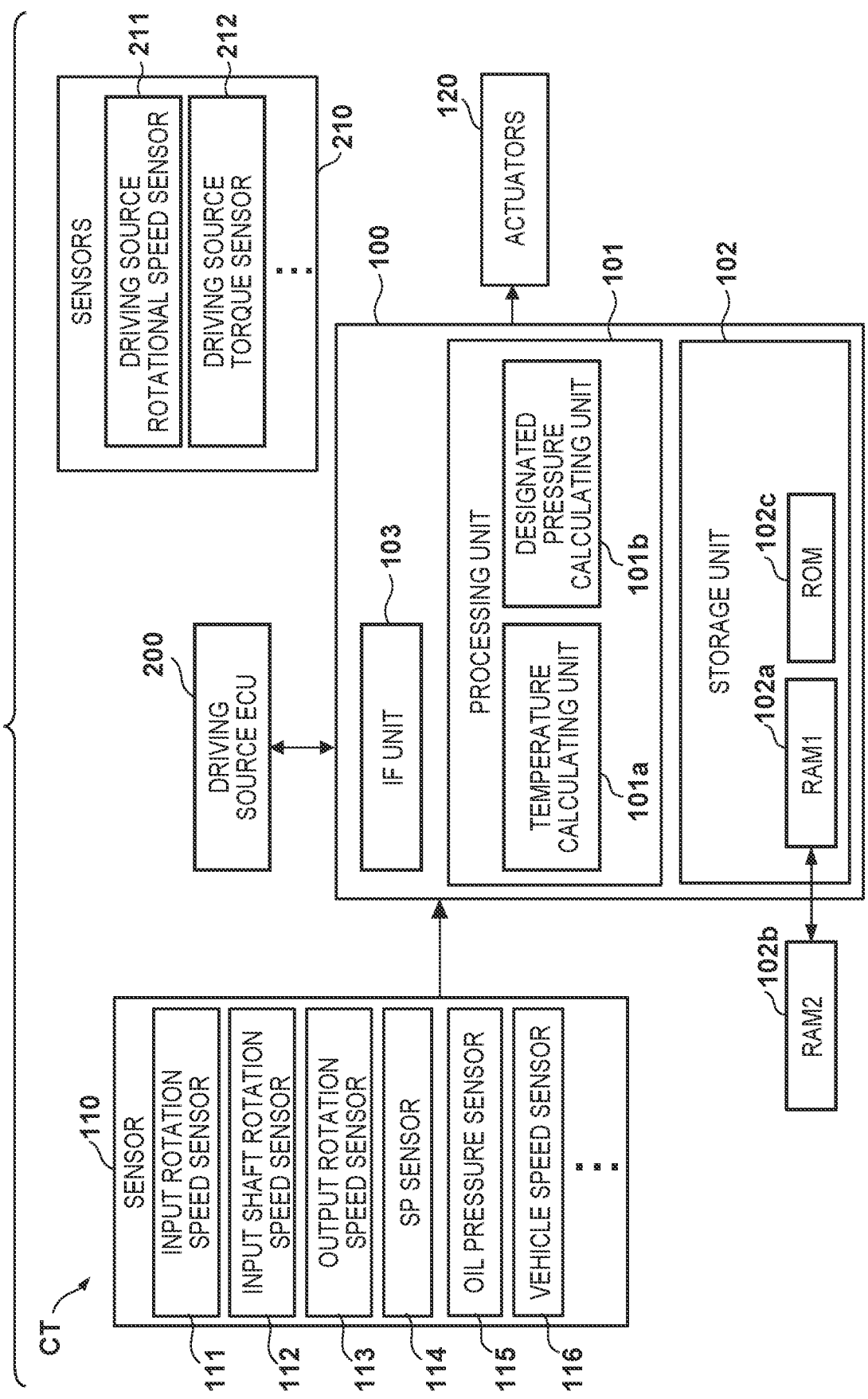
FIGS. 4A and 4B are block diagrams showing the arrangement of a control device CT.
Figure 4B:
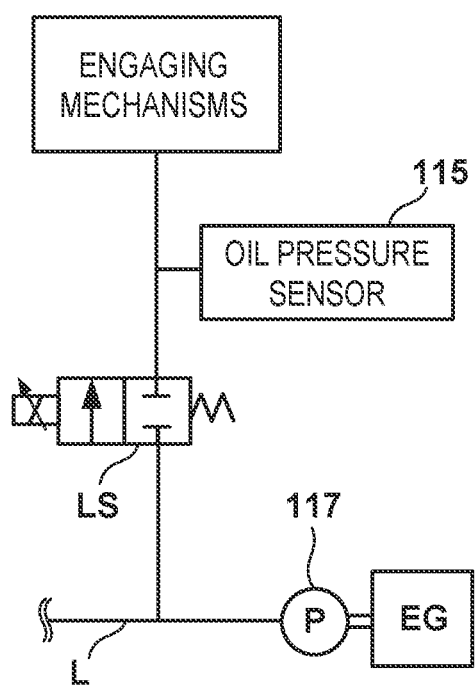

FIGS. 4A and 4B are block diagrams showing the arrangement of the control device CT. The control device CT includes a transmission TCU 100 and a driving source ECU 200. The driving source ECU 200 can control the driving source EG. The transmission TCU 100 can control the power transmission device TM including the torque converter TC with the lock-up clutch LC capable of connecting an output shaft 2 of the driving source EG and the input shaft 10 of the power transmission device TM. The transmission TCU 100 can receive various kinds of information of the driving source EG and the transport apparatus TA (a vehicle) from the driving source ECU 200.

The driving source ECU 200 controls the driving source EG based on information from a sensor 210. The sensor 210 includes a driving source rotational speed sensor 211 for detecting the rotational speed of the driving source EG, and a driving source torque sensor 212 for detecting the torque of the driving source EG. Based on the detection results of the various sensors included in the sensor 210, the driving source ECU 200 can determine the driving state (operation state) of the driving source EG.

The rotation output of the driving source EG is output to the driving source output shaft 2. The rotation of the driving source output shaft 2 is transmitted to the input shaft 10 of the power transmission device TM via the torque converter TC. The torque converter TC transmits the rotation torque of the driving source output shaft 2 to the input shaft 10 of the power transmission device TM via a fluid (hydraulic oil (ATF)).

The lock-up clutch LC performs lock-up control to connect a pump impeller 33 and a turbine wheel 32 by oil pressure control based on an instruction from the transmission TCU 100. In the open state of the lock-up clutch LC, that is, in a state in which the pump impeller 33 and the turbine wheel 32 are not connected, the relative rotation of the pump impeller 33 and the turbine wheel 32 is permitted. In this state, when the rotation torque of the driving source output shaft 2 is transmitted to the pump impeller 33, the hydraulic oil (ATF) filling the torque converter TC circulates from the pump impeller 33 to the turbine wheel 32 along with the rotation of the pump impeller 33. Accordingly, the rotation torque of the pump impeller 33 is transmitted to the turbine wheel 32 to drive the input shaft 10. On the other hand, in the engaged state of the lock-up clutch, the relative rotation of the pump impeller 33 and the turbine wheel 32 is restricted, and the rotation torque of the driving source output shaft 2 is directly transmitted to the input shaft 10 of the power transmission device TM.

The transmission TCU 100 includes a processing unit 101 such as a CPU, a storage unit 102 including a RAM1 (102a) and a ROM 102c, and an IF unit 103 which functions as a connecting unit for performing communication between the processing unit 101 and an external device and the driving source ECU. The IF unit 103 includes a communication interface or input/output interface.

The processing unit 101 of the transmission TCU 100 includes a temperature calculating unit 101a for calculating the temperature of a connecting/disconnecting unit, and a designated pressure calculating unit 101b for obtaining a conversion coefficient corresponding to the temperature calculated by the temperature calculating unit 101a by referring to a conversion table storing conversion coefficients each indicating a use time converted value under a temperature environment obtained by converting the temperature into a reference temperature as a reference of life evaluation.

The designated pressure calculating unit 101b calculates a thermal history by dividing, by the lifetime at the reference temperature, an added conversion coefficient obtained by adding a conversion coefficient corresponding to the calculated temperature and a cumulatively added reference temperature conversion coefficient. The designated pressure calculating unit 101b calculates a control pressure correction value for correcting the control pressure of the connecting/disconnecting unit until the upper limit of the thermal history is reached, and controls the connecting/disconnecting unit by the control pressure corrected based on the calculated control pressure correction value.

The RAM1 (102a) stores, for example, the thermal history of the connecting/disconnecting unit. The transmission TCU 100 resets the thermal history stored in the RAM1 (102a), based on the replacement of the connecting/disconnecting unit. The RAM1 (102a) stores the mileage of the transport apparatus TA. The transmission TCU 100 resets the mileage stored in the RAM1 (102a), based on the replacement of the connecting/disconnecting unit.

The transport apparatus TA includes a RAM2 (102b) as a second storage unit for backing up the thermal history stored in the RAM 1 (102a). When the transmission TCU 100 is replaced, a replacing transmission TCU 100 stores the thermal history, which is stored in the RAM2 (102b), in the RAM1 (102a) of the replacing transmission TCU 100.

The processing unit 101 executes programs stored in the storage unit 102, and controls various actuators 120 based on detection results from various sensors 110.

The various sensors 110 include various sensors installed in the power transmission device TM. FIG. 4A shows the following sensors as examples. An input rotational speed sensor 111 is a sensor for detecting the number of rotations input from the driving source EG to the torque converter TC, that is, the number of rotations (the rotational speed) of the output shaft of the driving source EG. An input shaft rotational speed sensor 112 is a sensor for detecting the number of rotations (the rotational speed) of the input shaft 10. The slip ratio: ETR of the torque converter TC is calculated by equation (1) below:

$$ETR(\%) = (\text{rotational speed detected by input shaft rotational speed sensor 112})/(\text{rotational speed detected by input rotational speed sensor 111}) \times 100 \quad (1)$$

An output rotational speed sensor 113 is a sensor for detecting the number of rotations (the rotational speed) of the output shaft S.

An SP sensor (shift position sensor) 114 is a sensor for detecting a shift position selected by the driver. In this embodiment, four types of shift positions, that is, P range (parking range), D range (forward range), N range (neutral range), and R range (reverse range) are assumed. If the D range is selected, the processing unit 101 can select one of the first range (1st) to the 10th range (10th) in accordance with a gear change map stored in the storage unit 102 and change the gear. If the R range is selected, the processing unit 101 selects the reverse range.

An oil pressure sensor 115 includes a sensor for detecting the oil pressure of hydraulic oil in each of the engaging mechanisms C1 to C3 and B1 to B3. A vehicle speed sensor 116 detects the running speed of the transport apparatus TA (a vehicle) on which the power transmission device TM is mounted. The mileage of the transport apparatus TA (a vehicle) can be calculated by integrating the detection result of the vehicle speed sensor 116.

The various actuators 120 include various actuators installed in the power transmission device TM. For example, the actuators 120 include an electromagnetic actuator such as an electromagnetic solenoid which generates a driving force (load or thrust) for switching the operation states of each of the lockup clutch LC and the engaging mechanisms C1 to C3, B1 to B3, and F1. The processing unit 101 thus controls the various actuators 120.

FIG. 4B shows an installation example of the oil pressure sensor 115. For example, the oil pressure sensor 115 can be installed for each of the engaging mechanisms C1 to C3 and B1 to B3. This makes it possible to detect the oil pressure of hydraulic oil in each engaging mechanism.

A solenoid valve LS for supplying hydraulic oil is assigned to each engaging mechanism. Engagement and release of each engaging mechanism can be switched by opening or closing a supply line L of hydraulic oil by the solenoid valve LS. The oil pressure sensor 115 is provided so as to receive the hydraulic oil supplied from the solenoid valve LS to the engaging mechanism. The detection result of the oil pressure sensor 115 represents the oil pressure of the hydraulic oil supplied to the engaging mechanism. An oil pump 117 driven by the driving source EG forces the hydraulic oil into the supply line L. The connecting/disconnecting unit controls the fastened state and released state by the fluid pressure, and the control device controls the connecting/disconnecting unit by varying the fluid pressure.

Figure 6:
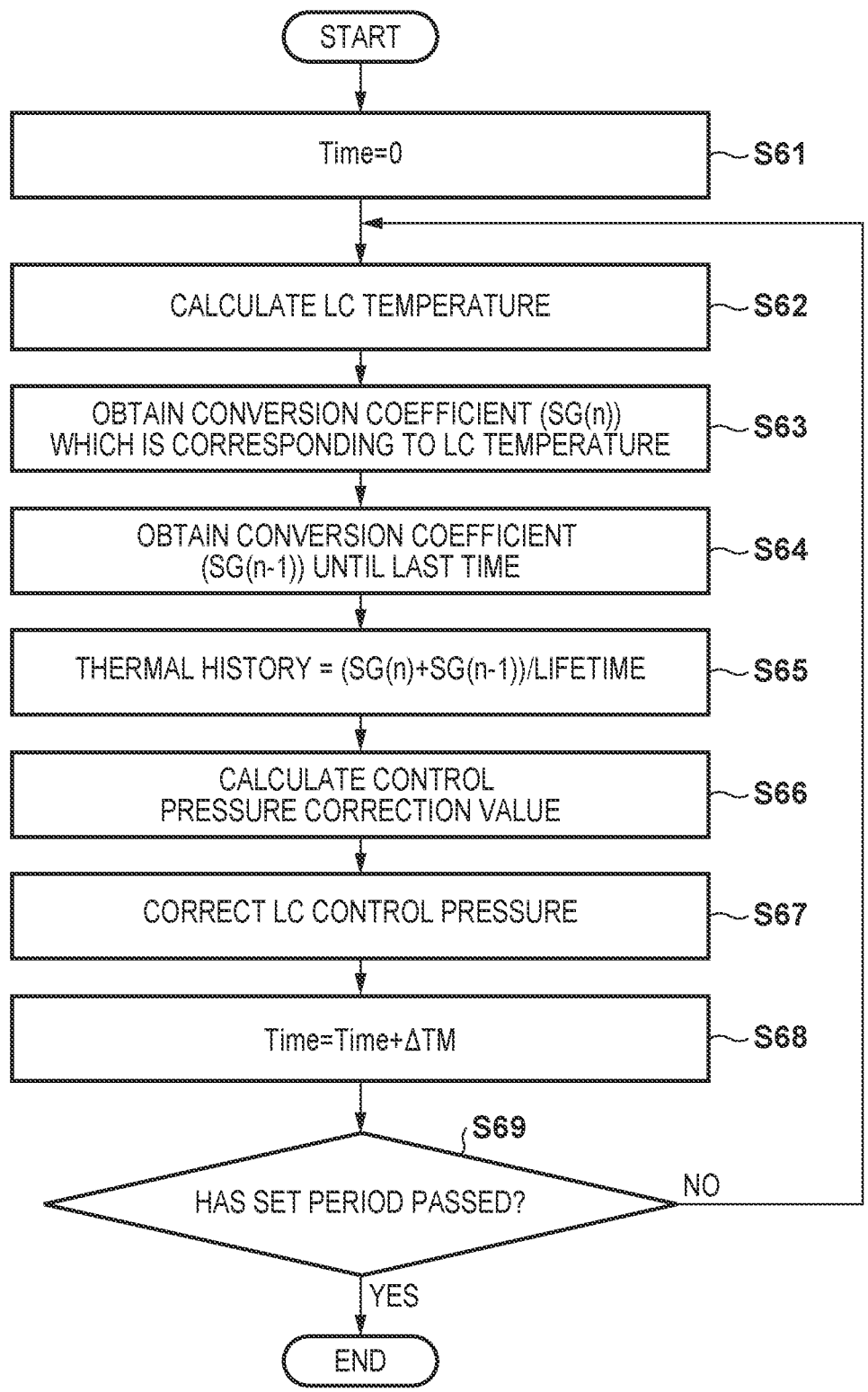
FIG. 6 is a flowchart for explaining the procedures of processes of a temperature calculating unit and a designated pressure calculating unit.

FIG. 6 is a flowchart for explaining the procedures of processes of the temperature calculating unit 101a and the designated pressure calculating unit 101b. In step S61, a time for controlling the execution of arithmetic processing is set to Time=0.

In step S62, the temperature (an estimated value) of the plate surface of the lock-up clutch LC is calculated. The temperature calculating unit 101a of the processing unit 101 obtains the torque of the driving source EG estimated from information such as the rotational speed, air intake amount, and ignition timing of the driving source EG for each preset time interval (ATM), and calculates the temperature (an estimated value) of the plate surface of the lock-up clutch LC. Note that when the driving source torque sensor 212 and the oil pressure sensor 115 are installed as shown in FIG. 2, the temperature calculating unit 101a may also calculate the temperature (an estimated value) of the plate surface of the lock-up clutch LC by obtaining the detection results from the driving source torque sensor 212 and the oil pressure sensor 115 for each preset time interval (ATM).

In step S63, the designated pressure calculating unit 101b obtains a conversion coefficient of the calculated temperature of the plate surface of the lock-up clutch LC. That is, the designated pressure calculating unit 101b obtains a conversion coefficient corresponding to the temperature of the plate surface of the lock-up clutch, which is calculated for each set time interval (ATM), by referring to a conversion table.

FIG. 5 is a view showing the arrangement of a conversion table 510 stored in, for example, the ROM 102c of the transmission TCU 100. In the conversion table 510, a temperature T0 of the lock-up clutch LC is a reference temperature as a reference of life evaluation, and a reference conversion coefficient K0 corresponding to the reference temperature is a parameter indicating a use time converted value at the reference temperature T0.

The conversion table 510 stores combinations of a plurality of temperatures and conversion coefficients corresponding to the temperatures. In the conversion table 510, conversion coefficients (for example, K1, K2, ... ) corresponding to temperatures (for example, T1, ... ) higher than the reference temperature T0 and temperatures (for example, T2, ... ) lower than the reference temperature T0 are set. Each of the conversion coefficients (K1, K2, ... ) is a parameter indicating a use time converted value under a temperature environment obtained by converting the corresponding temperature into a reference temperature as a reference of life evaluation.

If the temperature (an estimated value) calculated by the temperature calculating unit 101a is the temperature T1, the designated pressure calculating unit 101b obtains the conversion coefficient K1 corresponding to the temperature T1 by referring to the conversion table 510. The designated pressure calculating unit 101b sets, as SG(n), the conversion coefficient K1 corresponding to the temperature T1 calculated by the temperature calculating unit 101a. The conversion coefficient K1 corresponding to the temperature T1 indicates the use time converted value under the temperature environment obtained by converting the temperature T1 into the reference temperature T0 as the reference of life evaluation. That is, when converted into use at the reference temperature T0, the use of the lock-up clutch LC at the temperature T1 is use at the use time converted value multiplied by a conversion coefficient ratio K1/K0. For example, when conversion coefficient ratio K1/K0=N, the use at the temperature T1 is the use over the time N when converted into the reference temperature T0.

In step S64, the designated pressure calculating unit 101b obtains a reference temperature conversion coefficient (SG(n−1)) cumulatively added by the arithmetic processing already calculated until the last time from the RAM 1 (102a).

In step S65, the designated pressure calculating unit 101b calculates the thermal history. The designated calculating unit 101b adds the conversion coefficient (SG(n)) indicating the use time converted value under the temperature environment in which the temperature (for example, T1) obtained by the calculation performed this time is converted into the reference temperature, and a reference temperature conversion coefficient (SG(n−1)) cumulatively added by the arithmetic processing performed until the last time, and calculates the thermal history by dividing the added conversion coefficient (SG(n)+SG(n−1)) by the lifetime at the reference temperature.

Equation (2) below is a numerical expression of the above arithmetic processing. The designated pressure calculating unit 101b calculates the thermal history by executing the calculation of equation (2) below for each set time interval (ATM).

$$\text{Thermal history}=(SG(n)+SG(n-1))/\text{lifetime} \quad (2)$$

The lifetime is a physical value combining the lock-up clutch LC and the hydraulic oil (ATF), and determined based on, for example, a friction coefficient ratio (μ ratio: friction coefficient μ when differential rotation of clutch is small/friction coefficient μ when differential rotation is large). The lifetime is a time required for the μ ratio to exceed 1 when continuously giving the heat of the lock-up clutch LC and the hydraulic oil (ATF).

The added conversion coefficient (SG(n)+SG(n−1)) obtained by adding the conversion coefficient (SG(n)) corresponding to the temperature obtained by the calculation performed this time and the reference temperature conversion coefficient (SG(n−1)) accumulated by the arithmetic processing performed until the last time is an accumulated value (integrated value) of the use time converted value under the temperature environment converted into the reference temperature, and the thermal history is a parameter indicating an extent to which the accumulated value of the use time converted value under the temperature environment converted into the reference temperature has increased with respect to the lifetime.

In this step, the designated pressure calculating unit 101b stores, in the RAM1 (102a), the added conversion coefficient (SG(n)+SG(n−1)) obtained by adding the conversion coefficient (SG(n)) corresponding to the temperature obtained by the calculation performed this time, and the reference temperature conversion coefficient (SG(n−1)) accumulated by the arithmetic processing performed until the last time. In arithmetic processing for obtaining the next thermal history, the stored added conversion coefficient is used as the conversion coefficient accumulated by the arithmetic processing performed until the last time.

In step S66, the designated pressure calculating unit 101b calculates a control pressure correction value for correcting the control pressure for controlling the lock-up clutch LC based on the thermal history.

In step S67, the designated pressure calculating unit 101b controls the lock-up clutch LC by correcting the control pressure based on the calculated control pressure correction value.

In step S68, a time for controlling the execution of arithmetic processing is set to Time=Time+ΔTM.

In step S69, if Time has not passed a preset period from a brand-new state as the use time of the lock-up clutch LC (S69—No), the process is returned to step S62, and the same process is executed.

On the other hand, if Time has passed the set period in step S69 (S69—Yes), the process is terminated. When this process is terminated, the designated pressure calculating unit 101b does not perform the process of correcting the control pressure of the lock-up clutch LC.

Figure 7A:
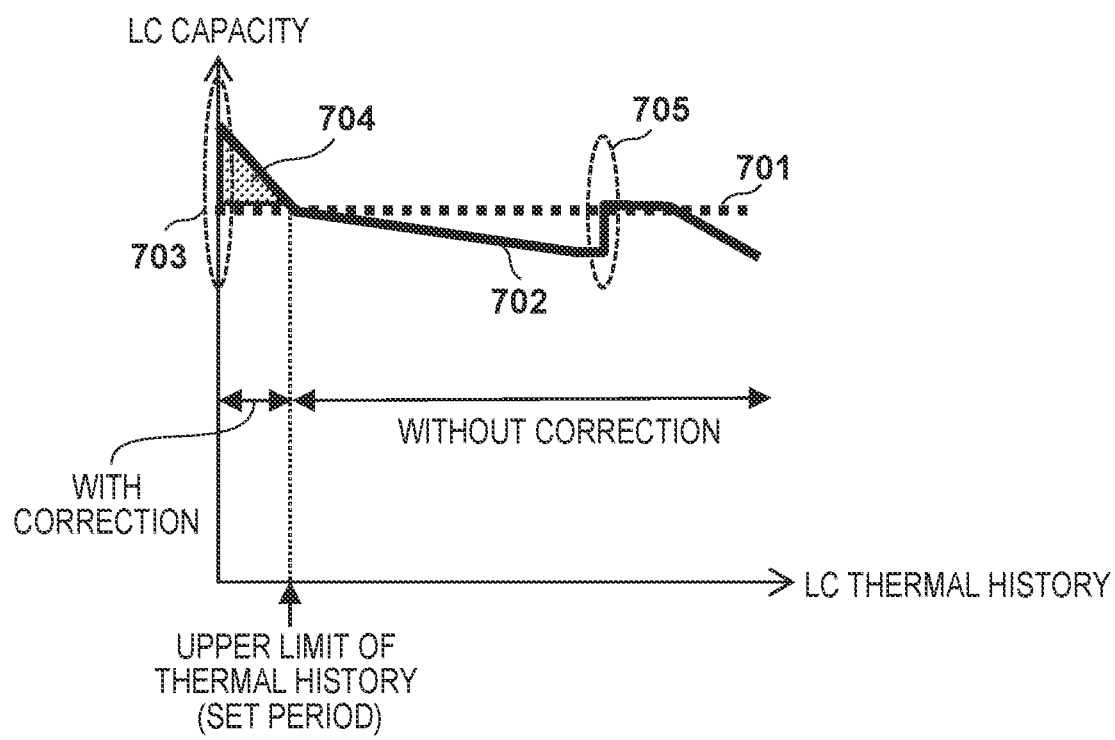
FIG. 7A is a graph showing the relationship between the lock-up clutch capacitor and the thermal history.
Figure 7B:
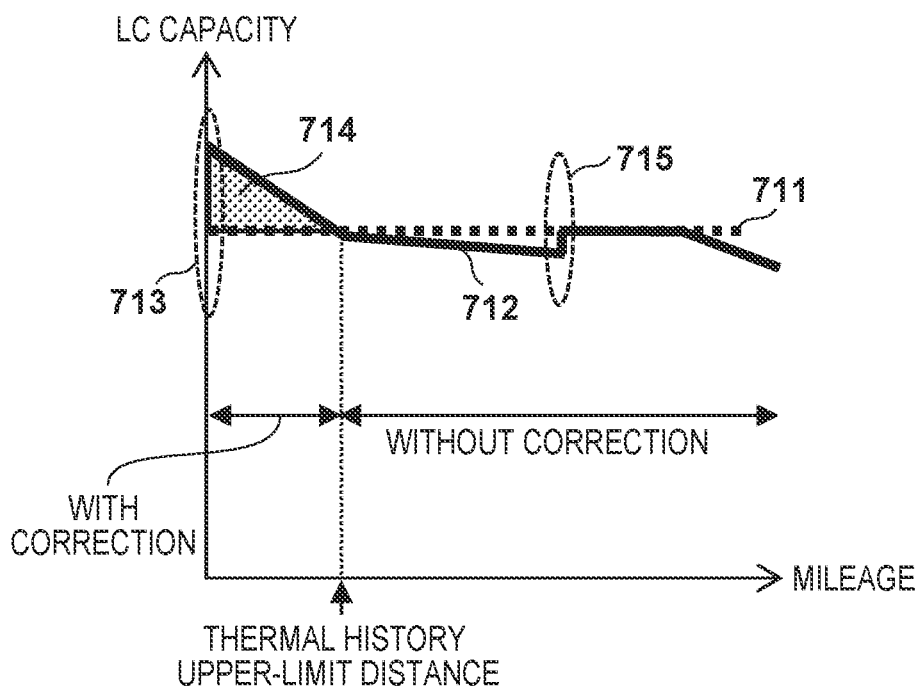
FIG. 7B is a graph showing the relationship between the lock-up clutch capacity and the mileage.

FIG. 7A is a graph showing the relationship between the lock-up clutch capacity (LC capacity: the ordinate) and the thermal history (LC thermal history: the abscissa). FIG. 7B is a graph showing the relationship between the lock-up clutch capacity (LC capacity: the ordinate) and the mileage (the abscissa).

In FIG. 7A, the LC capacity indicated by a broken line 701 shows the conventional setting of the LC capacity. In this setting, the control pressure of the lock-up clutch is controlled by using a uniform LC capacity.

In practice, however, the LC capacity changes as indicated by a solid line 702. When the lock-up clutch LC is in a brand-new state 703 (or when the lock-up clutch LC and the whole amount of the hydraulic oil (ATF) are replaced), the thermal history is low, and the LC capacity is larger than the set value of the broken line 701. As the lock-up clutch LC is used, the friction coefficient decreases, and the LC capacity decreases.

A region 704 in which the LC capacity indicated by the solid line 702 is larger than the LC capacity indicated by the broken line 701 is a region where the control pressure of the lock-up clutch is corrected. In the control pressure correction value calculating process in step S66, the designated pressure calculating unit 101b calculates, as the control pressure correction value, the difference between the LC capacity (a real LC capacity) of the solid line 702 and the LC capacity (a reference LC capacity) of the broken line 701 so that the former approaches the latter. In the LC control pressure correcting process in step S67, the designated pressure calculating unit 101b subtracts the calculated control pressure correction value from the real LC capacity, thereby correcting the control pressure and controlling the lock-up clutch LC.

The designated pressure calculating unit 101b executes the correction process until the upper limit of the thermal history is reached (until a preset period passes). At the upper limit of the thermal history, the difference between the LC capacity (real LC capacity) of the solid line 702 and the LC capacity (reference LC capacity) of the broken line 701 becomes zero. That is, the LC capacity (real LC capacity) of the solid line 702 and the LC capacity (reference LC capacity) of the broken line 701 become equal. An upper limit SLIM of the thermal history can be preset, and the designated pressure calculating unit 101b compares the preset upper limit SLIM of the thermal history with the calculated thermal history. Based on the calculated thermal history, the designated pressure calculating unit 101b calculates a control pressure correction value for correcting the control pressure of the connecting/disconnecting unit C until the upper limit of the thermal history is reached. Based on the calculated control pressure correction value, the designated pressure calculating unit 101b controls the connecting/disconnecting unit C by the corrected control pressure.

In a region 705, the hydraulic oil (ATF) is partially replaced, so the LC capacity increases but does not exceed the LC capacity indicated by the broken line 701, and hence the designated pressure calculating unit 101b does not perform the correction process.

In FIG. 7B, the LC capacity indicated by a broken line 711 shows the conventional setting of the LC capacity. In this setting, the control pressure of the lock-up clutch is controlled by using a uniform LC capacity in the same manner as in FIG. 7A.

In practice, however, the LC capacity changes as indicated by a solid line 712, so the LC capacity is larger than the set value of the broken line 711 in a state 713 in which the mileage is short. As the mileage increases and the lock-up clutch LC is used, the friction coefficient decreases, and the LC capacity decreases as indicated by the solid line 712.

A region 714 where the LC capacitor indicated by the solid line 712 is larger than that indicated by the broken line 711 is a region where the control pressure of the lock-up clutch is corrected.

In the control pressure correcting process, the designated pressure calculating unit 101b calculates, as the control pressure correction value, the difference between the LC capacity (real LC capacity) of the solid line 712 and the LC capacity (reference LC capacity) of the broken line 711, so that the former approaches the latter. The designated pressure calculating unit 101b subtracts the calculated control pressure correction value from the real LC capacity, thereby correcting the control pressure and controlling the lock-up clutch LC.

The designated pressure calculating unit 101b sets, as the thermal history upper-limit distance, a mileage at which the difference between the LC capacity (real LC capacity) of the solid line 712 and the LC capacity (reference LC capacity) of the broken line 711 becomes zero, and executes the correction process until the mileage reaches the thermal history upper-limit distance. That is, the designated pressure calculating unit 101b executes the correction process until the mileage (thermal history upper-limit distance) at which the thermal history becomes the upper limit is reached. In a region 715 where the thermal history upper-limit distance exceeded, the hydraulic oil (ATF) is partially replaced, so the LC capacity (real LC capacity) of the solid line 712 increases but does not exceed the LC capacity (reference LC capacity) of the broken line 711, and hence the designated pressure calculating unit 101b does not perform the correction process.

<Modifications>

In the embodiment explained above, the conversion coefficient corresponding to the temperature of the connecting/disconnecting unit is obtained by referring to the conversion table, and the thermal history is calculated based on the conversion coefficient and the lifetime. Instead, it is also possible to calculate the thermal history based on an integrated value obtained by integrating the temperature of the connecting/disconnecting unit and the heating time during which the connecting/disconnecting unit is heated by this temperature.

In the same manner as in the above embodiment, the temperature calculating unit 101a obtains the torque of the driving source EG estimated from information such as the rotational speed, air intake amount, and ignition timing of the driving source EG for each preset time interval (ΔTM), and calculates the temperature T1 (an estimated value) of the plate surface of the lock-up clutch LC. When calculating the temperature T1, the temperature calculating unit 101a stores the time information and integrates the time interval (ΔTM), thereby obtaining a heating time HTi at the temperature T1.

The designated pressure calculating unit 101b calculates the thermal history based on an integrated value S1 obtained by integrating the temperature T1 calculated by the temperature calculating unit 101a and the heating time HTi during which the connecting/disconnecting unit C is heated at the temperature T1. For example, letting HT1 be the heating time at a temperature T1, integrated value S1=T1×HT1. Also, letting HT2 be the heating time at a temperature T2, integrated value S2=T2×HT2.

The designated pressure calculating unit 101b calculates, as the thermal history, the sum (accumulated integrated value S=S1+S2+ . . . +Sn) of the integrated values calculated based on each temperature and heating time.

The upper limit SLIM of the thermal history is a point at which the LC capacity (real LC capacity) of the solid line 702 in FIG. 7A and the LC capacity (reference LC capacity) of the broken line 701 become equal, and corresponds to the thermal history upper limit in FIG. 7A and the thermal history upper-limit distance in FIG. 7B.

The designated pressure calculating unit 101b compares the preset thermal history upper limit SLIM with the calculated thermal history (accumulated integrated value S). Based on the calculated thermal history, the designated pressure calculating unit 101b calculates a control pressure correction value for correcting the control pressure of the connecting/disconnecting unit C, until the thermal history upper limit is reached. Then, based on the calculated control pressure correction value, the designated pressure calculating unit 101b controls the connecting/disconnecting unit C by the corrected control pressure.

In this example, the thermal history can be calculated based on the calculated temperature and the heating time without using the conversion table, and the connecting/disconnecting unit is controlled by the calculated thermal history. This makes it possible to designate a fastening pressure matching the friction coefficient which changes with time based on the thermal history, and perform driving while suppressing a fastening shock and the like.

Second Embodiment

In the previous embodiment, an arrangement which obtains the thermal history based on the temperature of the connecting/disconnecting unit has been explained. In this embodiment, an arrangement which calculates the thermal history based on the temperature and calorific value of a connecting/disconnecting unit C and corrects the control pressure of the connecting/disconnecting unit C will be explained.

Figure 8:
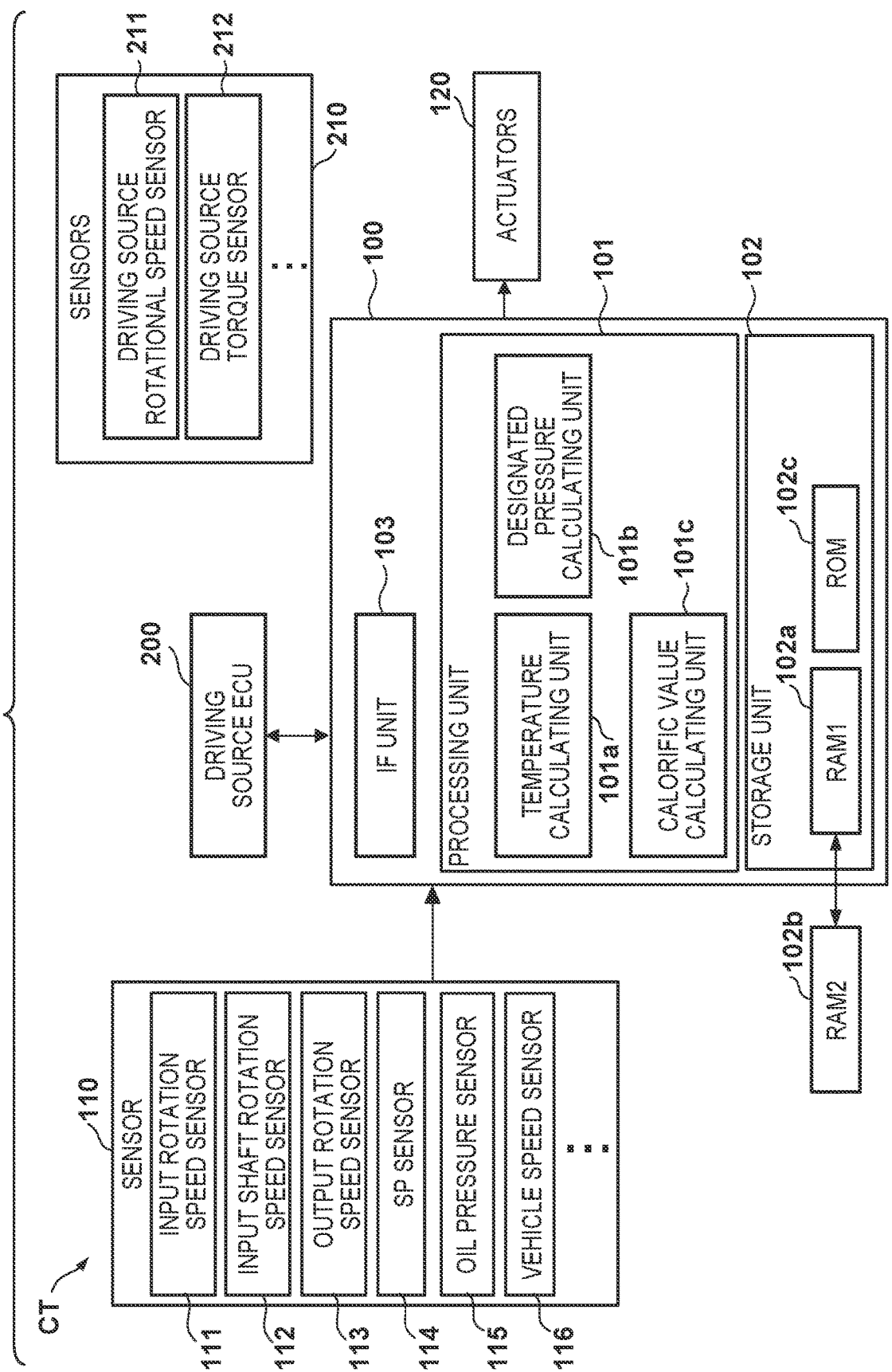
FIG. 8 is a block diagram showing the arrangement of a control device CT of the second embodiment.

FIG. 8 is a block diagram showing the arrangement of a control device CT of the second embodiment. The arrangement of the control device CT is basically the same as that of the control device CT shown in FIG. 4A explained in the previous embodiment, but the control device CT shown in FIG. 8 includes a calorific value calculating unit 101c as a component of a processing unit 101 of a transmission TCU 100, and this is the difference from the control device CT shown in FIG. 4A. The difference from the arrangement shown in FIG. 4A will be explained below.

The processing unit 101 of the transmission TCU 100 includes a temperature calculating unit 101a for calculating the temperature of the connecting/disconnecting unit C, the calorific value calculating unit 101c for calculating the calorific value of the connecting/disconnecting unit C, and a designated pressure calculating unit 101b for obtaining, by referring to a conversion table storing a conversion coefficient indicating a use time converted value, a conversion coefficient corresponding to the temperature and calorific value of the connecting/disconnecting unit C. The conversion coefficient indicating the use time converted value is a coefficient obtained by converting information combining the temperature and calorific value of the connecting/disconnecting unit C into the use time of the connecting/disconnecting unit C. The designated pressure calculating unit 101b obtains a conversion coefficient corresponding to the temperature calculated by the temperature calculating unit 101a and the calorific value calculated by the calorific value calculating unit 101c by referring to the conversion table storing conversion coefficients.

The designated pressure calculating unit 101b calculates the thermal history by dividing an added conversion coefficient, which is obtained by adding the conversion coefficient corresponding to the temperature calculated by the temperature calculating unit 101a and the calorific value calculated by the calorific value calculating unit 101c and a cumulatively added conversion coefficient, by the lifetime at a reference temperature and a reference calorific value. The designated pressure calculating unit 101b calculates a control pressure correction value for correcting the control pressure of the connecting/disconnecting unit C until the upper limit of the thermal history is reached, and controls the connecting/disconnecting unit C by the control pressure corrected based on the calculated control pressure correction value.

Figure 9:
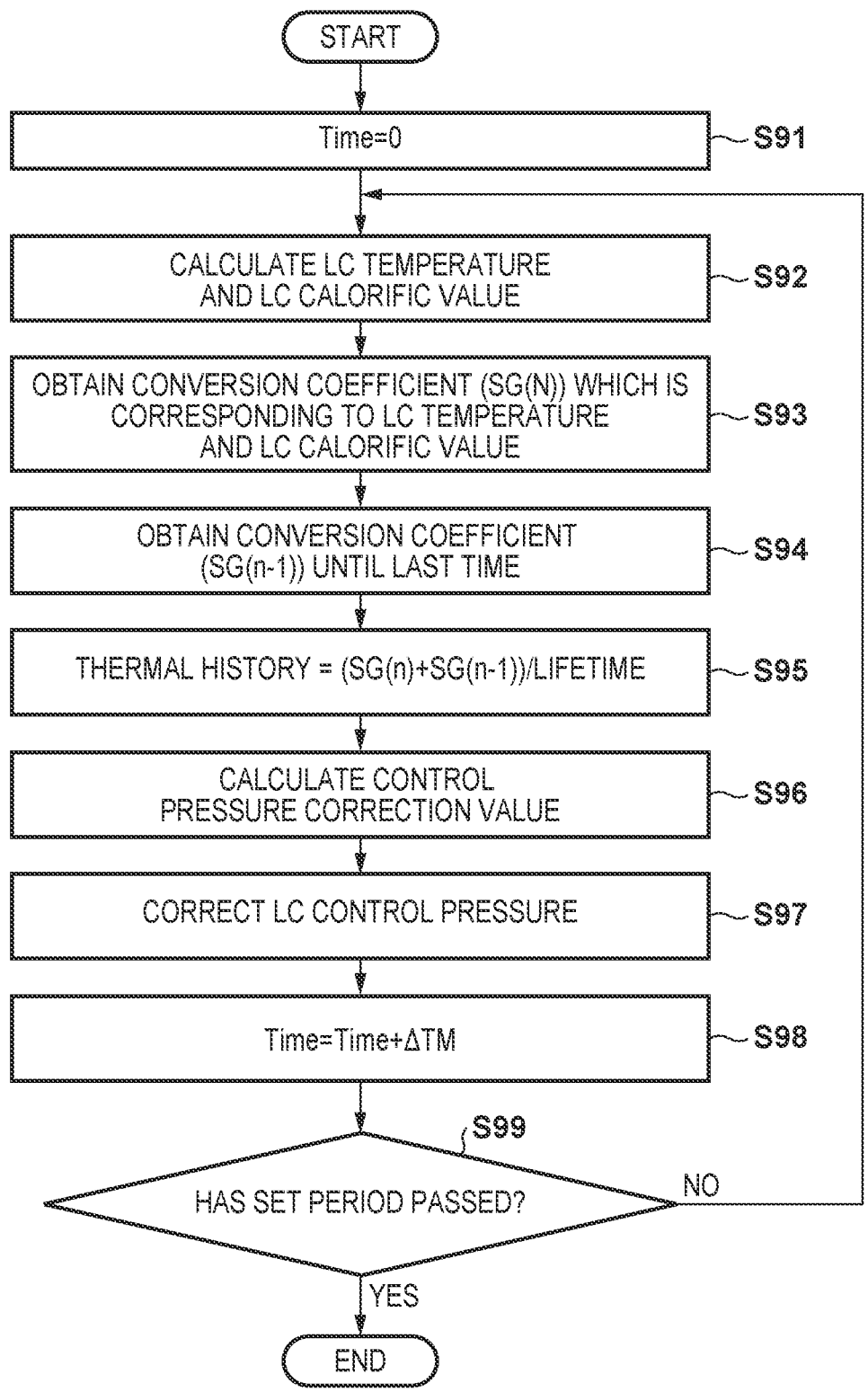
FIG. 9 is a flowchart for explaining the procedure of processing of a temperature calculating unit, a calorific value calculating unit, and a designated pressure calculating unit.

FIG. 9 is a flowchart for explaining the procedure of processing of the temperature calculating unit 101a, the calorific value calculating unit 101c, and the designated pressure calculating unit 101b. In step S91, a time for controlling the execution of arithmetic processing is set to Time=0.

In step S92, the temperature (an estimated value) and the calorific value (an estimated value) of the plate surface of a lock-up clutch LC are calculated. The temperature calculating unit 101a of the processing unit 101 obtains the torque of a driving source EG, which is estimated from information such as the rotational speed, air intake amount, and ignition timing of the driving source EG, for each preset time interval (ΔTM), and calculates the temperature (an estimated value) of the plate surface of the lock-up clutch LC. Also, the calorific value calculating unit 101c of the processing unit 101 obtains the torque of the driving source EG, which is estimated from information such as the rotational speed, air intake amount, and ignition timing of the driving source EG, for each preset time interval (ΔTM), obtains a temperature change (for example, a temperature change of the plate surface) of the lock-up clutch LC, and calculates the calorific value (an estimated value) based on the obtained temperature change and the heat capacity of the lock-up clutch LC. Note that when a driving source torque sensor 212 and an oil pressure sensor 115 are installed as shown in FIG. 8, the temperature calculating unit 101a and the calorific value calculating unit 101c may also calculate the temperature (an estimated value) and the calorific value (an estimated value) of the plate surface of the lock-up clutch LC, by obtaining the detection results from the driving source torque sensor 212 and the oil pressure sensor 115, for each preset time interval (ΔTM).

In step S93, the designated pressure calculating unit 101b obtains a conversion coefficient corresponding to the temperature and calorific value of the plate surface of the lock-up clutch LC, which are calculated this time. That is, the designated pressure calculating unit 101b obtains a conversion coefficient corresponding to the temperature and calorific value of the plate surface of the lock-up clutch LC, which are calculated for each set time interval (ΔTM), by referring to the conversion table.

FIG. 10 is a view showing the arrangement of a conversion table 1010 stored in, for example, a ROM 102c of the transmission TCU 100. In the conversion table 1010, a temperature T5 (an LC plate temperature) of the lock-up clutch LC is a reference temperature as a reference of life evaluation, and a calorific value CV4 (an LC calorific value) of the lock-up clutch LC is a reference calorific value as a reference of life evaluation. A reference conversion coefficient KS54 corresponding to the reference temperature T5 and the reference calorific value CV4 is a parameter indicating a use time converted value at the reference temperature T5 and the reference calorific value CV4.

In the conversion table 1010, LC plate temperatures T6, T7, and T8 indicate temperatures higher than the reference temperature T5, and LC plate temperatures T1, T2, T3, and T4 indicate temperatures lower than the reference temperature T5. Also, in the conversion table 1010, LC calorific values CV5, CV60, and CV7 indicate calorific values higher than the reference calorific value CV4, and LC calorific values CV1, CV2, and CV3 indicate calorific values lower than the reference calorific value CV4.

In the conversion table 1010, conversion coefficients KS (for example, KS53, KS54, KS55, . . . ) corresponding to combinations of a plurality of temperatures (LC plate temperatures) and a plurality of calorific values (LC calorific values) are set. The conversion coefficient KS is a parameter indicating a use time converted value under an environment in which the corresponding temperature and calorific value are converted into the reference temperature and reference calorific value as references of life evaluation.

When the temperature (an estimated value) calculated by the temperature calculating unit 101a is, for example, the temperature T6 and the calorific value (an estimated value) calculated by the calorific value calculating unit 101c is, for example, the calorific value CV5, the designated pressure calculating unit 101b obtains a conversion coefficient KS65 corresponding to the temperature T6 and the calorific value CV5 by referring to the conversion table 1010. The designated pressure calculating unit 101b sets the conversion coefficient KS65 corresponding to the temperature T6 and the calorific value CV5 as SG(n). The conversion coefficient KS65 corresponding to the temperature T6 and the calorific value CV5 indicates a use time converted value under an environment in which the temperature T6 and the calorific value CV5 are converted into the reference temperature T5 and the reference calorific value CV4 as the references of life evaluation. That is, when converted into use at the reference temperature T5 and the reference calorific value CV4, the use of the lock-up clutch LC at the temperature T6 and the calorific value CV5 is use at a use time converted value multiplied by a conversion coefficient ratio KS65/KS54. For example, when conversion coefficient ratio KS65/KS54=NS, the use at the temperature T6 and the calorific value CV5 is use over the time NS when converted into the reference temperature T5 and the reference calorific value CV4.

In step S94, the designated pressure calculating unit 101b obtains a conversion coefficient (SG(n−1)) cumulatively added by the arithmetic processing already calculated until the last time from a RAM1 (102a).

In step S95, the designated pressure calculating unit 101b calculates the thermal history. The designated calculating unit 101b adds a conversion coefficient (SG(n)) indicating a use time converted value under an environment in which the temperature and the calorific value (for example, T17 and CV5) obtained by the calculation performed this time are converted into the reference temperature and the reference calorific value, and a conversion coefficient (SG(n−1)) of the reference temperature and the reference calorific value cumulatively added by the arithmetic processing performed until the last time, and calculates the thermal history by dividing the added conversion coefficient (SG(n)+SG(n−1)) by a lifetime at the reference temperature and the reference calorific value. A numerical expression of the above arithmetic processing is the same as equation (2) explained earlier. The designated pressure calculating unit 101b calculates the thermal history by executing the calculation of equation (2) for each set time interval (ΔTM).

The added conversion coefficient (SG(n)+SG(n−1)) obtained by adding the conversion coefficient (SG(n)) obtained by the calculation performed this time, and the conversion coefficient (SG(n−1)) of the reference temperature and the reference calorific value cumulatively added by the arithmetic processing performed until the last time, is the accumulated value (integrated value) of a use time converted value under an environment converted into the reference temperature and the reference calorific value. In this embodiment, the thermal history is a parameter indicating an extent to which the accumulated value of the use time converted value under the environment converted into the reference temperature and the reference calorific value has increased with respect to the lifetime.

In this step, the designated pressure calculating unit 101*b* stores, in the RAM1 (102*a*), the added conversion coefficient (SG(n)+SG(n−1)) obtained by adding the conversion coefficient (SG(n)) obtained by the calculation performed this time, and the conversion coefficient (SG(n−1)) of the reference temperature and the reference calorific value cumulatively added by the arithmetic processing performed until the last time. In arithmetic processing for obtaining the next thermal history, the added conversion coefficient stored in this step is used as the conversion coefficient accumulated by the arithmetic processing performed until the last time.

In step S96, the designated pressure calculating unit 101*b* calculates a control pressure correction value for correcting the control pressure for controlling the lock-up clutch LC based on the thermal history.

In step S97, the designated value calculating unit 101*b* controls the lock-up clutch LC by correcting the control pressure, based on the calculated control pressure correction value.

In step S98, a time for controlling the execution of arithmetic processing is set to Time=Time+ΔTM.

In step S99, if Time has not passed a preset period from a brand-new state as the use time of the lock-up clutch LC (No in step S99), the process is returned to step S92, and the same process is executed.

On the other hand, if Time has passed the set period in step S99 (YES in step S99), the process is terminated. When this process is terminated, the designated pressure calculating unit 101*b* does not perform the process of correcting the control pressure of the lock-up clutch LC.

In this embodiment, the thermal history can be calculated based on the temperature and calorific value of the connecting/disconnecting unit C, and the control pressure of the connecting/disconnecting unit C can be corrected based on the thermal history reflecting the temperature and calorific value of the connecting/disconnecting unit C.

Summary of Embodiments

Arrangement 1. A transport apparatus (for example, FIG. 1, TA) of the abovementioned embodiment includes a driving source (for example, FIG. 1, EG),
an output shaft (for example, FIG. 1, S), and
a power transmission device (for example, FIG. 1, TM) capable of performing power transmission between the driving source and the output shaft,
the transport apparatus including a control device (for example, CT) which controls the driving source (EG) and the power transmission device (TM),
wherein the power transmission device (TM) includes a connecting/disconnecting unit (for example, C in FIG. 1, LC and TC in FIG. 2) configured to control a fastened state in which the power transmission is performed, and a released state in which the power transmission is not performed, and
the control device (CT) controls the connecting/disconnecting unit (C) based on a thermal history of the connecting/disconnecting unit (C).

According to the embodiment of arrangement 1, the connecting/disconnecting unit can be controlled by using the thermal history as an evaluation parameter for the friction coefficient which changes with time. Also, since the connecting/disconnecting unit is controlled by the thermal history, it is possible to designate a fastening pressure matching the friction coefficient which changes with time based on the thermal history, and perform driving which suppresses a fastening shock and the like.

Arrangement 2. The control device performs the control until a preset period elapses from the start of use of the power transmission device.

According to the embodiment of arrangement 2, the friction coefficient of the connecting/disconnecting unit changes by the thermal history until a preset period elapses since the connecting/disconnecting unit is brand new. Therefore, driving which suppresses a fastening shock and the like can be performed by performing variable control in the period. In addition, the friction coefficient becomes stable after the period has elapsed, so variable control need not be performed, and control can be simplified.

Arrangement 3. The control device (CT) determines the period based on a mileage of the transport apparatus (TA), and does not control the connecting/disconnecting unit (CT) after the period has elapsed.

According to the embodiment of arrangement 3, the friction coefficient of the connecting/disconnecting unit changes by the thermal history until the transport apparatus runs a predetermined distance since the connecting/disconnecting unit is brand new. Therefore, driving which suppresses a fastening shock and the like can be performed by performing variable control in the period.

Since the friction coefficient becomes stable after the period has elapsed, variable control need not be performed, and control can be simplified.

Arrangement 4. The control device (CT) includes a storage unit (for example, 102, RAM1) configured to store the thermal history, and the control device resets the thermal history stored in the storage unit (102, RAM1), based on replacement of the connecting/disconnecting unit.

Arrangement 5. The storage unit (102, RAM1) in the control device (CT) stores the mileage of the transport apparatus, and the control device (CT) resets the mileage stored in the storage unit, based on replacement of the connecting/disconnecting unit (C).

According to the embodiments of arrangements 4 and 5, when the connecting/disconnecting unit is replaced, not only the connecting/disconnecting unit itself but also internal lubricating oil of the power transmission device is replaced. By resetting the thermal history, therefore, it is again possible to designate a fastening pressure matching the friction coefficient which changes with time based on the thermal history, and perform driving which suppresses a fastening shock and the like.

Arrangement 6. The transport apparatus (TA) includes a second storage unit (for example, RAM2) configured to back up the thermal history stored in the storage unit (102, RAM1), and
when the control device (CT) is replaced, a replacing control device (CT) stores the thermal history, which is stored in the second storage unit (RAM2), in a storage unit (RAM1) of the replacing control device.

According to the embodiment of arrangement 6, if the thermal history is reset although the connecting/disconnecting unit is not replaced, an actual state and a controlled state of the connecting/disconnecting unit may become different from each other. Therefore, the thermal history is not reset when only the control device is replaced. This makes it possible to perform driving which suppresses a fastening shock and the like even after the control device is replaced.

Arrangement 7. The connecting/disconnecting unit (C) controls the fastened state and the released state by a fluid pressure, and the control device (CT) controls the connecting/disconnecting unit (CT) by varying the fluid pressure.

According to the embodiment of arrangement 7, the connecting/disconnecting unit is controlled by using the fluid pressure, so the transmission torque of the connecting/disconnecting unit can be varied by varying the fluid pressure. By setting the fluid pressure variable based on the thermal history, it is possible to designate a fastening pressure matching the friction coefficient which changes with time, and perform driving which suppresses a fastening shock and the like.

Arrangement 8. The transport apparatus (TA) includes an actuator (for example, 120) which generates a driving force for switching operation states of the connecting/disconnecting unit, and the control device (CT) controls the connecting/disconnecting unit (C) by controlling the actuator.

According to the embodiment of arrangement 8, a driving force matching the friction coefficient which changes with time can be designated by controlling the actuator for generating a driving force, and driving which suppresses a fastening shock and the like can be performed.

Arrangement 9. The control device (CT) includes
a temperature calculating unit (for example, 101a) configured to calculate a temperature of the connecting/disconnecting unit (C), and
a designated pressure calculating unit (for example, 101b) configured to refer to a conversion table (for example, 510 in FIG. 5) storing a conversion coefficient indicating a use time converted value under a temperature environment in which the temperature is converted into a reference temperature as a reference of life evaluation, and obtain a conversion coefficient corresponding to the calculated temperature, and
the designated pressure calculating unit calculates the thermal history (for example, equation (2)) by dividing, by a lifetime at the reference temperature, an added conversion coefficient obtained by adding the conversion coefficient corresponding to the calculated temperature and a cumulatively added reference temperature conversion coefficient.

Arrangement 10. The control device (CT) includes
a temperature calculating unit (for example, 101a) configured to calculate a temperature of the connecting/disconnecting unit (C), and
a designated pressure calculating unit (for example, 101b) configured to calculate the thermal history based on an integrated value obtained by integrating the temperature calculated by the temperature calculating unit (101a), and a heating time during which the connecting/disconnecting unit is heated at the calculated temperature.

According to the embodiment of arrangement 10, the thermal history can be calculated based on the calculated temperature and the heating time without using a conversion table, and the connecting/disconnecting unit is controlled by the calculated thermal history. This makes it possible to designate a fastening pressure matching the friction coefficient which changes with time based on the thermal history, and perform driving which suppresses a fastening shock.

Arrangement 11. The control device (CT) includes
a temperature calculating unit (for example, 101a) configured to calculate a temperature of the connecting/disconnecting unit,
a calorific value calculating unit (for example, 101c) configured to calculate a calorific value of the connecting/disconnecting unit, and
a designated pressure calculating unit (for example, 101b) configured to obtain, by referring to a conversion table (for example, 1010 in FIG. 10) storing a conversion coefficient indicating a use time converted value under an environment in which the temperature and the calorific value are converted into a reference temperature and a reference calorific value as references of life evaluation, a conversion coefficient corresponding to the calculated temperature and the calculated calorific value, and
the designated pressure calculating unit (101b) calculates the thermal history (for example, equation (2)) by dividing an added conversion coefficient, which is obtained by adding the conversion coefficient corresponding to the calculated temperature and the calculated calorific value and a cumulatively added conversion coefficient of the reference temperature and the reference calorific value, by a lifetime at the reference temperature and the reference calorific value.

According to arrangement 11, the thermal history can be calculated based on the temperature and calorific value of the connecting/disconnecting unit (connecting/disconnecting unit C), and the control pressure of the connecting/disconnecting unit (connecting/disconnecting unit C) can be corrected based on the thermal history reflecting the temperature and calorific value of the connecting/disconnecting unit (connecting/disconnecting unit C).

Arrangement 12. The designated pressure calculating unit (101b) calculates a control pressure correction value for correcting a control pressure of the connecting/disconnecting unit (C) until an upper limit of the thermal history is reached, and controls the connecting/disconnecting unit (C) by the corrected control pressure based on the calculated control pressure correction value.

According to the embodiments of arrangements 9, 10, 11 and 12, the connecting/disconnecting unit can be controlled by using the thermal history as an evaluation parameter for the friction coefficient which changes with time.

What is claimed is:
1. A transport apparatus including:
a driving source;
an output shaft; and
a power transmission device capable of performing power transmission between the driving source and the output shaft,
the transport apparatus comprising a control device which controls the driving source and the power transmission device,
wherein the power transmission device includes a connecting/disconnecting unit configured to control a fastened state in which the power transmission is performed, and a released state in which the power transmission is not performed, and
wherein the control device calculates a control pressure correction value for correcting a control pressure of the connecting/disconnecting unit based on a thermal history of the connecting/disconnecting unit, and controls the connecting/disconnecting unit by the control pressure corrected based on the calculated control pressure correction value, and performs controlling of the con- necting/disconnecting unit by the control pressure until an elapse of a preset period during which an upper limit of the thermal history is reached from a start of use of the power transmission device in a brand-new state.

2. The apparatus according to claim 1, wherein the control device determines the period based on a mileage of the transport apparatus, and does not control the connecting/disconnecting unit after the period has elapsed.

3. The apparatus according to claim 1, wherein
the control device includes a storage unit configured to store the thermal history, and
the control device resets the thermal history stored in the storage unit, based on replacement of the connecting/disconnecting unit.

4. The apparatus according to claim 3, wherein
the storage unit stores a mileage of the transport apparatus, and
the control device resets the mileage stored in the storage unit, based on replacement of the connecting/disconnecting unit.

5. The apparatus according to claim 3, wherein
the transport apparatus comprises a second storage unit configured to back up the thermal history stored in the storage unit, and
when the control device is replaced, a replacing control device stores the thermal history, which is stored in the second storage unit, in a storage unit of the replacing control device.

6. The apparatus according to claim 1, wherein
the connecting/disconnecting unit controls the fastened state and the released state by a fluid pressure, and
the control device controls the connecting/disconnecting unit by varying the fluid pressure.

7. The apparatus according to claim 1, wherein
the transport apparatus comprises an actuator which generates a driving force for switching operation states of the connecting/disconnecting unit, and
the control device controls the actuator.

8. The apparatus according to claim 1, wherein
the control device includes:
a temperature calculating unit configured to calculate a temperature of the connecting/disconnecting unit; and
a designated pressure calculating unit configured to refer to a conversion table storing a conversion coefficient indicating a use time converted value under a temperature environment in which the temperature is converted into a reference temperature as a reference of life evaluation, and obtain a conversion coefficient corresponding to the calculated temperature, and
wherein the designated pressure calculating unit calculates the thermal history by dividing, by a lifetime at the reference temperature, an added conversion coefficient obtained by adding the conversion coefficient corresponding to the calculated temperature and a cumulatively added reference temperature conversion coefficient.

9. The apparatus according to claim 1, wherein the control device includes:
a temperature calculating unit configured to calculate a temperature of the connecting/disconnecting unit; and
a designated pressure calculating unit configured to calculate the thermal history based on an integrated value obtained by integrating the temperature calculated by the temperature calculating unit, and a heating time during which the connecting/disconnecting unit is heated at the calculated temperature.

10. The apparatus according to claim 1, wherein the control device includes:
a temperature calculating unit configured to calculate a temperature of the connecting/disconnecting unit;
a calorific value calculating unit configured to calculate a calorific value of the connecting/disconnecting unit; and
a designated pressure calculating unit configured to obtain, by referring to a conversion table storing a conversion coefficient indicating a use time converted value under an environment in which the temperature and the calorific value are converted into a reference temperature and a reference calorific value as references of life evaluation, a conversion coefficient corresponding to the calculated temperature and the calculated calorific value, and
the designated pressure calculating unit calculates the thermal history by dividing an added conversion coefficient, which is obtained by adding the conversion coefficient corresponding to the calculated temperature and the calculated calorific value and a cumulatively added conversion coefficient of the reference temperature and the reference calorific value, by a lifetime at the reference temperature and the reference calorific value.

* * * * *